United States Patent
Baiatu

[19]

[11] Patent Number: 6,094,129
[45] Date of Patent: *Jul. 25, 2000

[54] PTC THERMISTOR AND A CURRENT LIMITER DEVICE HAVING AT LEAST ONE PTC THERMISTOR

[75] Inventor: Tudor Baiatu, Brugg, Switzerland

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/895,041

[22] Filed: Jul. 16, 1997

Related U.S. Application Data

[63] Continuation of application No. 08/553,918, Nov. 6, 1995, abandoned.

[30] Foreign Application Priority Data

Nov. 19, 1994 [DE] Germany ............................... 44 41 280

[51] Int. Cl.⁷ ..................................................... H01C 7/10

[52] U.S. Cl. ........................... 338/22 R; 338/53; 338/55; 338/283; 338/210

[58] Field of Search ........................... 338/53–55, 61–63, 338/20–22 R, 99, 225 D, 58, 239, 260, 204, 254, 231, 51, 52, 283, 285, 210, 211, 212; 361/3, 58, 24, 25, 27, 31, 103, 106

[56] References Cited

U.S. PATENT DOCUMENTS

| | | | |
|---|---|---|---|
| 1,364,080 | 1/1921 | Davisson . | |
| 2,712,591 | 7/1955 | Rogell | 338/212 |
| 3,405,381 | 10/1968 | Zandman et al. | 338/254 |
| 3,452,314 | 6/1969 | Sapoff et al. | 338/22 R |

(List continued on next page.)

FOREIGN PATENT DOCUMENTS

| | | |
|---|---|---|
| 2 206 610 | 6/1974 | France . |
| 2 348 614 | 11/1977 | France . |
| 2 606 929 | 5/1988 | France . |
| 635403 | 8/1936 | Germany . |
| 1204302 | 11/1965 | Germany . |
| 1253332 | 11/1967 | Germany . |
| 2715878 | 11/1977 | Germany . |
| 2831495 | 1/1980 | Germany . |
| 3338709A1 | 5/1985 | Germany . |
| 3726422A1 | 2/1989 | Germany . |
| 3942266C1 | 3/1991 | Germany . |
| 9100865 U | 4/1991 | Germany . |
| 4105786A1 | 8/1992 | Germany . |
| 581377 | 10/1976 | Switzerland . |
| 294549 | 1/1930 | United Kingdom . |
| WO93/07667 | 4/1993 | WIPO . |

*Primary Examiner*—Karl Easthom
*Attorney, Agent, or Firm*—Burns, Doane, Swecker & Mathis, L.L.P.

[57] ABSTRACT

PTC thermistors are used in reversible short circuit current limiters, in particular in series connection with electrical valves and/or capacitors. An electrically insulated, thermally conductive insulation or ceramic layer (20) is in contact electrically and with good thermal conduction via a first main surface with a metallic cooling element (25). A second main surface of the ceramic layer (20), opposite the first main surface, is covered with an electrically insulating thermal-conduction layer (21) having a thickness in the range from 10 $\mu$m–100 $\mu$m. Meandering tracks (16) of the resistive body of the PTC thermistor (5) are pressed between this thermal conduction layer (21) and an electrically insulating, preferably thermally conductive, flexible high-temperature stable polymer film (22). In order to provide pressure, a pressure compensation cushion (23) on which a force (F) orthogonal to the second main surface of the ceramic layer (20) acts, may be provided. The pressure compensation cushion (23) is filled with a dielectric or electrically conductive fluid (24) having a boiling temperature above preferably 150° C. The resistive track (16) may also be embedded in a filled polymer matrix, it being possible for geometrically congruent resistive tracks to be opposite on a ceramic layer.

16 Claims, 3 Drawing Sheets

6,094,129
Page 2

U.S. PATENT DOCUMENTS

| | | | |
|---|---|---|---|
| 3,654,580 | 4/1972 | Laisi | 338/61 |
| 3,673,538 | 6/1972 | Faxon | 338/25 |
| 3,719,796 | 3/1973 | Abildtrup | 219/462 |
| 3,805,022 | 4/1974 | Kulwicki et al. | 219/505 |
| 3,813,631 | 5/1974 | Matsuda et al. | 338/320 |
| 3,824,521 | 7/1974 | Horii et al. | 338/275 |
| 3,916,264 | 10/1975 | Berg | 361/106 |
| 3,996,447 | 12/1976 | Bouffard et al. | |
| 4,024,427 | 5/1977 | Belhomme | 315/8 |
| 4,064,477 | 12/1977 | Thompson | 338/51 |
| 4,152,689 | 5/1979 | Thompson | 338/254 |
| 4,317,027 | 2/1982 | Middleman et al. | 219/553 |
| 4,387,291 | 6/1983 | Keppel | 338/320 |
| 4,420,739 | 12/1983 | Herren | 338/53 |
| 4,427,965 | 1/1984 | Simonsen | 338/55 |
| 4,568,907 | 2/1986 | Hurtle | 338/61 |
| 4,698,614 | 10/1987 | Welch et al. | |
| 4,816,958 | 3/1989 | Belbel et al. | |
| 4,937,696 | 6/1990 | Yoshino et al. | |
| 5,064,997 | 11/1991 | Fang et al. | 219/505 |
| 5,208,576 | 5/1993 | Wunderlich et al. | 338/248 |
| 5,353,005 | 10/1994 | Salanki | 338/55 |
| 5,379,022 | 1/1995 | Bacon et al. | 338/20 |
| 5,436,609 | 7/1995 | Chan et al. | 338/22 R |
| 5,644,461 | 7/1997 | Miller et al. | 338/22 R |
| 5,796,568 | 8/1998 | Baiatu | 338/22 R |

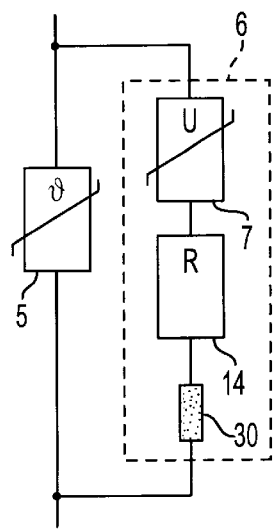
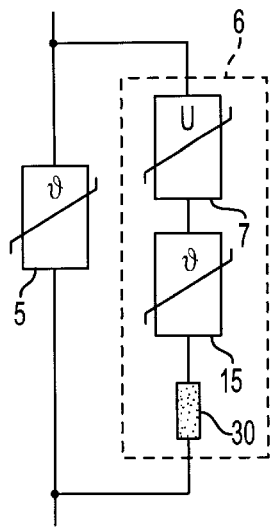
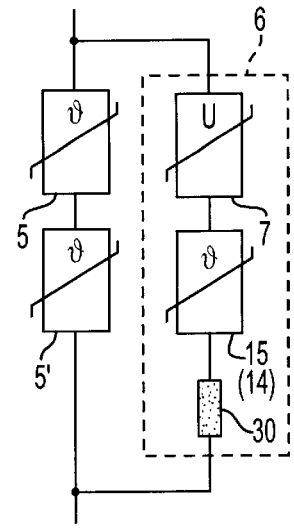
FIG. 3     FIG. 4     FIG. 5
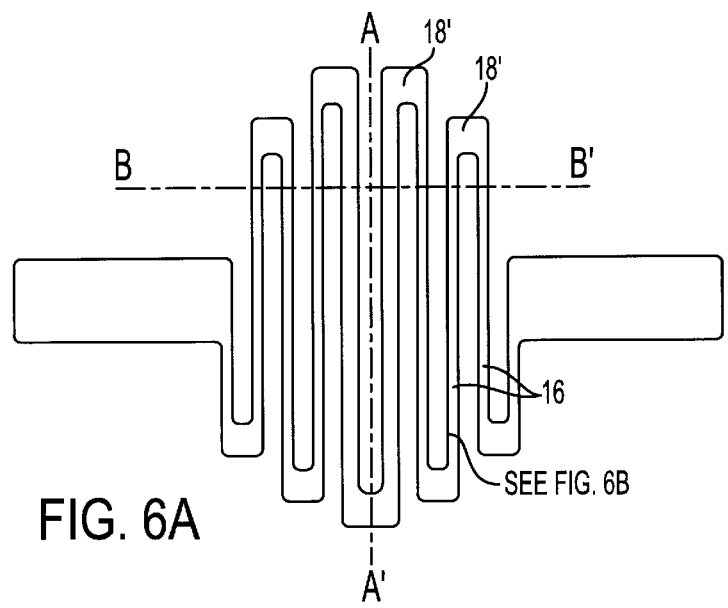
FIG. 6A
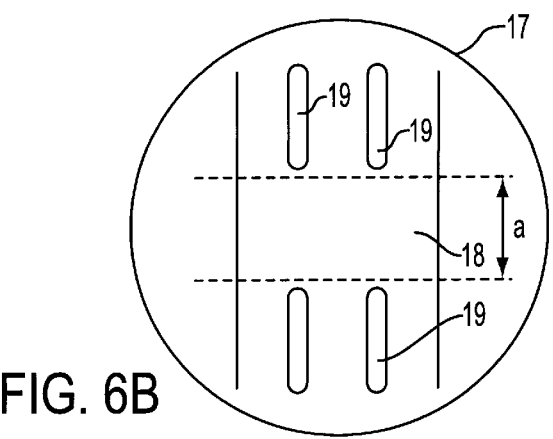
FIG. 6B

PTC THERMISTOR AND A CURRENT LIMITER DEVICE HAVING AT LEAST ONE PTC THERMISTOR

This application is a continuation of application Ser No. 08/153,918, filed Nov. 6, 1995, now abandoned.

BACKGROUND OF THE INVENTION

1. Field of the Invention

The invention relates to PTC thermistors and to a current limiter device having at least one PTC thermistor.

2. Discussion of Background

A known PTC thermistor is disclosed by DE 39 42 266 C1 in which, the heat developed by a PTC heating device is discharged via the electrodes of the thermistor to a hollow profiled aluminum support body which is electrically insulated from the electrodes by an insulating film. A leaf spring anchored in the profiled support body presses against the relatively thin top wall of the thermistor.

This is the case of a low-voltage application of a PTC heating device, with limited electrical insulation requirement.

Another known thermistor is disclosed by DE-A 27 15 878. In this case a resistive body made of a material having a positive temperature coefficient of resistance, together with its electrodes, is embedded in a mass of 30 mol % silicone rubber and 70 mol % magnesium oxide and dissipates heat to an aluminum heating tube comprised of a pair of curling tongs. This heating device is suitable for a continuous use temperature of up to 149° C.

A known current limiter device having at least one PTC thermistor is disclosed by DE-B 1 204 302. In the switching device specified therein for breaking circuits, 2 series-connected thermistors are arranged in a first circuit, 2 series-connected varistors are arranged in a second circuit, electrically connected in parallel, and a switch is arranged in a third circuit, also connected in parallel. This is a current commutation circuit, in which the thermistors are of barium oxide and barium titanate. The thermistors can withstand only a few amps of continuous current, and are off-load in continuous operation.

U.S. Pat. No. 4,583,146 likewise discloses, in order to guarantee arc-free quenching, connection of a PTC thermistor and a varistor in parallel branches to a mechanical breaker contact. The PTC thermistor may have a thin varistor layer at the end. When the mechanical switch is opened, the current switches from the breaker contact to the PTC thermistor and varistor.

In circuits without a breaker contact, the dynamic response of such a current limiter circuit is unsatisfactory.

CH-A-581 377 discloses connection of a PTC thermistor in parallel with a fixed-value resistor and with a thermally or magnetically trippable first switch, a second, voltage build-up switch being connected in series with this parallel circuit. In this case the PTC thermistor is loaded only in the event of short circuit, in which case it increases its resistance and allows substantially load-free switching of the second switch. Instead of one PTC thermistor, a plurality of different PTC thermistors which respond one after the other may be connected in parallel.

The paper by P. Bujard and J. P. Ansermet, "Thermally conductive aluminium nitride-filled epoxy" in: 5th IEEE Semi-therm Symposium (1989), pp. 126–130, discloses how to achieve a filling ratio of 62 vol % in the case of an aluminum nitride (AlN) filled polymer matrix as is suitable for production of PTC thermistors.

In the case of current convertors which have a DC intermediate circuit, in the event of a short circuit it is possible for very large short circuit currents to occur in the intermediate circuit as a result of low-impedance discharging of the intermediate circuit capacitors. These currents can destroy active components in the absence of protective measures, and can stress and deform structural parts with large forces.

DE 3 710 799 A1 discloses, in the case of an invertor circuit, provision of a fuse in series connection with capacitors, which fuse melts and breaks the circuit if a DC capacitor is short-circuited. A time period of, if appropriate, a few hundreds of ms elapses from the time when the lines of the invertor circuit are short-circuited before a detector, which responds to the melting of the fuse, detects this short circuit in delayed fashion. Only an internal short circuit of a DC capacitor is detected. The associated instruments and circuits are thereby protected in the event of an internal short circuit of a capacitor. Instead of the fuse, a differential amplifier, which detects a fault by means of a potential difference, may also be provided as fault detector for groups of series-connected DC capacitors.

For traction current convertors, which are exposed to increased vibrational and impact stresses, the use of conventional fuses is not possible, because of their low reliability, or not desirable to railroad operators. Fuses are large components requiring a great deal of wiring, which build up high back-emfs. The back-emfs interferes with the operation of current convertors having switchable semiconductors. Required responses of less than 100 $\mu$s are difficult, if not impossible, to obtain.

A considerable reduction in or elimination of the intermediate-circuit inductance is desirable for current convertor operation. However, in the absence of protective measures, the short circuit current strengths are thereby increased in the event of short circuit to values of up to 1 MA which cannot at present be mechanically kept under control in traction systems using current convertors.

Reference is further made to CH-PS 581 377, which discloses a PTC thermistor component having a ceramic PTC thermistor which is cooled at its electrodes. Its peripheral insulating protective layer of epoxy resin is a poor conductor of heat.

U.S. Pat. No. 3,996,447 discloses, in the case of a heating device having a PTC thermistor, application of a heat-transfer compound between the electrodes and the heat sink, but not on the lateral surface.

German utility model G 91 00 865.4 discloses a liquid-cooled, low-induction slotted high-load impedance element having at least two mutually separated congruent resistive tracks. The resistive tracks are electrically connected together in such a way that the current can flow in an antiparallel direction. The resistive tracks are bonded, on the one hand, to a support body and, on the other hand, to electrically insulating, thermally conductive disks which dissipate the heat produced to liquid heat sinks.

DE-B 1,253,332 discloses a switching circuit for switching off heavy currents. Normal conductors are thermally coupled to PTC thermistors and electrically connected in series. In this case also, the PTC thermistors do not carry any continuous current.

DE 41 05 786 A1 discloses a meandering normal resistor which comprises two resistor elements arranged with mirror symmetry in a plane and is applied using thin-film technology or screen printing technology onto a ceramic heat sink that is electrically insulating and a good conductor of heat. A relatively high induction of this impedance element is undesirable.

DE 33 38 709 A1 discloses a liquid-cooled, low-induction impedance element, in which a resistor wire is routed in a zig-zag in grooves in a planar molded ceramic part, which is pressed onto a heat sink having flow channels. In order to reduce creep amplitudes, the resistor wire and the molded ceramic part are coated with a glaze.

SUMMARY OF THE INVENTION

Accordingly, one object of the invention is to provide a further development of the PTC thermistors and current limiter devices of the type mentioned at the outset such that they can carry a continuous current of more than 100 A and can limit short circuit currents within 10 μs to a value which is below the destruction limit of passive components of the electrical systems or circuits to be protected.

An advantage of the invention is that protective devices using these PTC thermistors work reversibly, respond without arcing, can be used in low-induction form, and save space. The protective circuits are low-loss, vibration-resistant and can be integrated in an existing cooling circuit; they respond autonomously and permit flexible application. The reliability of the protective system is not detrimentally influenced by additional electronic modules and components.

If the current limiter circuits are used in series connection with current convertor valves, then an inductor for limiting current rise can be obviated.

According to an advantageous configuration of the invention, short circuit currents can be limited within 10 μs to values which are below the destruction limit of active components of the electrical systems or circuits to be protected. In this case cooling of the active part of the current-limiter devices is essential. If a liquid cooling system is already present this cooling can be integrated into its cooling circuit.

By matching the dimension of the active part of the PTC thermistors, the short circuit response of the protective circuits can be matched flexibly to the different electrical characteristics of various types of current convertors.

With the PTC thermistors according to the invention it is possible to decouple the energy of a capacitor bank, internally stored in a current convertor, from a short circuit in the current-convertor circuits or semiconductors. In this case, the current limiter devices can be arranged either in the DC intermediate circuit or in the phase modules. Because of the modular nature of the intermediate-circuit capacitor battery which, if appropriate, has up to 40 capacitors connected in parallel, short circuit protection can be selectively arranged on one or more capacitors connected in parallel.

BRIEF DESCRIPTION OF THE DRAWINGS

A more complete appreciation of the invention and many of the attendant advantages thereof will be readily obtained by reference to the following detailed description considered in connection with the accompanying drawings, wherein:

FIGS. 3–5 show various current-limiter circuits having PTC thermistors, varistors and inductors, FIG. 6 shows an exemplary embodiment of the design of the resistive track of a PTC thermistor of a current-limiter circuit according to FIGS. 3–5.

DESCRIPTION OF THE PREFERRED EMBODIMENTS

Figure 1:
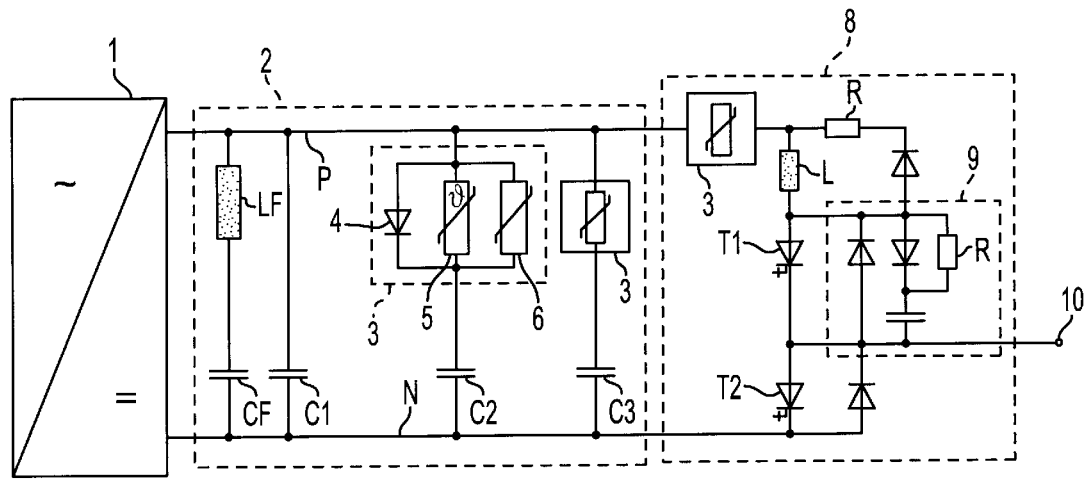
FIG. 1 shows a two-point current convertor circuit having a drive current convertor which is connected via a DC intermediate circuit to a line current convertor, a reversible current limiter being arranged in the short circuit path of capacitors of the DC intermediate circuit.

Referring now to the drawings, wherein like reference numerals designate identical or corresponding parts throughout the several views, FIG. 1 shows a line current convertor or first current convertor (1) which is electrically connected on the DC side via a DC intermediate circuit (2) to a drive current convertor or second current convertor (8).

The DC intermediate circuit (2) has, between a positive pole or a positive pole plate (P) and a negative pole or a negative pole plate (N), a filter, for damping intermediate circuit harmonics. The filter includes a filtering inductor (LF) and a filtering capacitor (CF) connected in series. The circuit (2) also has intermediate-circuit capacitors or capacitors (C1, C2, C3), the capacitors (C2, C3) being each connected in series to a reversible short circuit current limiter (3). The reversible short circuit current limiter (3) has, connected in parallel, a diode (4) connected in the reverse-bias direction of a short circuit path, a PTC thermistor (5) and a shunt resistor branch (6) containing a surge voltage protector or varistor (7) (cf. FIGS. 3–5). The PTC thermistor (5) and the shunt resistor branch (6) are always present in the short circuit current limiter (3), while the diode (4) may be connected in parallel.

The two current convertors (1, 8) are designed as two-point current convertors. Only two main valve branches having 2 GTO thyristors (T1, T2) as main valves for a AC phase, which can be tapped at an AC voltage terminal (10), are shown in FIG. 1 for the current convertor (8). Six similarly designed main valve branches are correspondingly required for three-phase AC. A thyristor circuit (9) is provided in parallel with each main valve (T1, T2); however; only the one in parallel with the GTO thyristor (T1) is represented for the sake of clarity. It is clear that the thyristor circuit (9) could also have been connected in a manner other than that represented. An inductor or di/dt limiter inductor (L) is connected via a reversible short circuit current limiter (3) to the positive pole (P) of the DC intermediate circuit (2) in the current path of the two main valves (T1, T2). A diode having an ohmic resistor in series is connected in a branch in parallel with the di/dt limiter inductor (L). This di/dt limiter inductor (L) may be kept very small or obviated when using the short circuit current limiter (3) according to the invention.

The reversible short circuit current limiter (3) in the second current convertor (8) can be obviated if reversible short circuit current limiters (3) are provided in the DC intermediate circuit (2). Moreover, the reversible short circuit current limiters (3) in the DC intermediate circuit (2) can be obviated if a reversible short circuit current limiter (3) is provided in the second current convertor (8).

Figure 2:
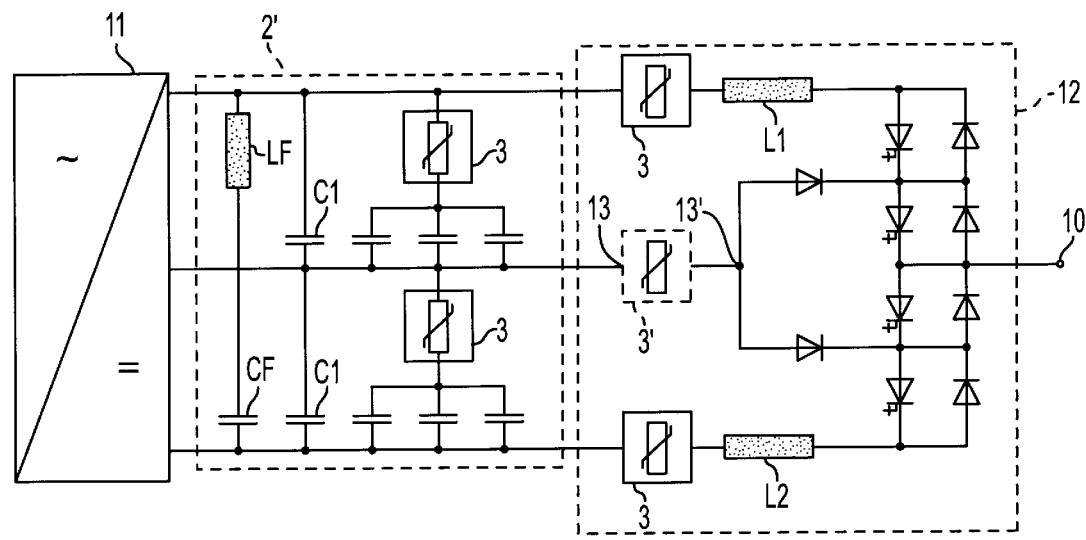
FIG. 2 shows a current convertor circuit according to FIG. 1, having three-point current convertors.

FIG. 2 shows, as a second exemplary embodiment, a current convertor circuit similar to FIG. 1 but having first and second three-point current convertors (11, 12) instead of first and second two-point current convertors (1, 8). In a DC intermediate circuit (2'), a reversible short circuit current limiter (3) is connected in series for each potential half with a capacitor bank which has a plurality of capacitors connected in parallel. The advantage of this circuit consists in a cost reduction of the protective circuit, since fewer reversible short circuit current limiters (3, 3') are necessary, or in a reduced system diversification, since fewer types of reversible short circuit current limiters (3, 3') are required for the range of current convertors.

In the case of the three-point current convertor (12), di/dt limiter inductors (L1, L2), which are electrically connected to the positive pole (P) or to the negative pole (N) of the DC intermediate circuit (2'), are connected in series with the main valves of each main valve branch. These inductors may have very low inductance or may be left out. A reversible short circuit current limiter (3') (represented in broken lines), which is electrically connected, on the one hand, to a neutral conductor (13') of the neutral path and, on the other hand, to a neutral conductor (13) of the DC intermediate circuit (2'), may be provided, instead of the two reversible short circuit current limiters (3), in this zero-point or neutral path of the current convertor (12). This produces sufficient protection for many types of malfunction. It is clear that, in the case of this exemplary embodiment as well, the reversible short circuit current limiters (3, 3') in the second current convertor (12) can be obviated if reversible short circuit current limiters (3) in the DC intermediate circuit (2') guarantee the desired protection, and vice versa.

It is important that a reversible short circuit current limiter (3, 3') is provided in the short circuit current path of at least one intermediate-circuit capacitor (C2, C3). The result of this is that possible short circuit discharge currents of the capacitors (C2, C3) are limited to values which are at least below the destruction limit of the passive components and of the conductor rails, and ideally below the destruction limit of the active components. The protective-circuit response times required for this are less than 10 µs.

The protective circuits according to FIGS. 1 and 2 guarantee good protection both in the case of a partial short circuit and in the case of a full short circuit of a current convertor (1, 8; 11, 12).

By virtue of the fact that a diode (4) is connected in parallel with a PTC thermistor (5), the thermal continuous-current loading of the reversible short circuit current limiters (3, 3') can be reduced. During operation under rated conditions, the diode (4) is forward-biased for one half period of the intermediate-circuit pulse frequency and thus reduces the rms current. In the event of a short circuit, the diode (4) is reverse-biased and the protective function of the reversible short circuit current limiter (3, 3') is fully effective.

If one or more intermediate-circuit capacitors (C1) are left without reversible short circuit current limiters (3), while the remaining intermediate-circuit capacitors (C2, C3) have one, then protection against switch-off surge voltages is achieved. However, the short circuit current magnitude of the total current in the DC intermediate circuit increases proportionately.

FIG. 3 shows a short circuit current limiter (3) in which a shunt resistor branch (6) having a varistor (7), an ohmic resistor (14) and an inductor (30) connected in series is connected in parallel with a PTC thermistor (5) in a first or main current path. In the event of a fault or short circuit, the PTC thermistor (5) heats up to above its response temperature, so that its resistance rises greatly and limits the current. Thermal destruction of the PTC thermistor (5) is avoided by switching the short circuit current to the shunt resistor branch (6). In this case the short circuit current is limited to values which are not harmful to the DC intermediate circuit (2). After discharge of the capacitors (C2, C3) connected in series with the short circuit current limiter (3) and disconnection of the first current convertor (1) from a supplying energy source (not represented), the PTC thermistor (5) cools and is again ready for operation.

The PTC thermistor (5) may be a nonblocking PTC thermistor of metal, having resistance jumps to approximately 10 times, preferably to less than 100 times its cold resistance, or a blocking PTC thermistor of filled polymers, which have resistance jumps to more than 100 times, preferably to more than $10^4$ times the cold resistance.

The use of a varistor (7), preferably of metal oxide, whose highest permissible continuous-operation voltage is preferably below the operating voltage of the DC intermediate circuit (2) is essential for the circuit according to FIG. 3. The ohmic resistor (14) connected in series with the varistor (7) improves the current limiting response of the circuit.

A PTC thermistor (15), which is blocking or nonblocking at the operating voltage, may be used according to FIG. 4 instead of the ohmic resistor (14) according to FIG. 3. This leads to an improved current limiting response of the short circuit current limiter (3). If both PTC thermistors (5, 15) have a resistance/temperature characteristic with high resistance jumps to resistive values which are considerably greater than 100 times, preferably greater than $10^4$ times the cold resistance value (blocking PTC thermistor (5)), then a current-blocking response of the total circuit can be achieved. It is thereby possible to use the short circuit current limiter (3) as a protective element in electrical power distribution systems or networks in which voltages are applied to the short circuit current limiter (3) for a relatively long period of time.

The short circuit current limiter (3) according to FIG. 5 differs from the one of FIG. 4 in that a nonblocking PTC thermistor (5) is connected in series with a blocking PTC thermistor (5') in the main current path. In this case the blocking PTC thermistor (5') is configured in such a way that its resistance increases only after the nonblocking PTC thermistor (5) has responded, i.e. that it responds with a time delay, cf. e.g. CH-A-581 377 mentioned earlier. As a result of this the PTC thermistor (5') is electrically and thermally discharged. In the shunt resistor branch (6), the PTC thermistor (15) can be replaced by an ohmic resistor (14) according to FIG. 3. In both cases, the circuit according to FIG. 5 is also suitable for protecting under overload conditions, the varistor (7) remaining in the blocking state. The continuous-operation voltage of the varistor (7) must in this case be higher than the operating voltage of the DC intermediate circuit (2).

If a high rated current carrying capacity of a few 100 A, with short response time in the event of short circuit and with small overall volume of the short circuit current limiter (3), is required, at least the PTC thermistors (5, 51) of the short circuit current limiter (3) need to be cooled. This cooling can, in the case of high power current convertors having an existing liquid cooling system, be integrated into the cooling circuit. The total losses of the protective device are insignificant for the loss balance of the current convertor (1, 8; 11, 12).

By virtue of the inductor (30), preferably provided in the shunt resistor branch (6), an improvement of the current-limiting response of the total circuit can be achieved.

FIG. 6 shows the shape of a resistive track of a nonblocking PTC thermistor (5), which is designed in its central part with meandering shape and symmetric relative to a section plane (A–A').

The starting basis is a metal sheet which is structured with meandering shape in the central part by means of a conventional cutting method such as, for example, water-jet cutting or laser cutting, or using a photolithography process. In order to achieve a uniform current distribution in the case of inhomogeneities (hot points), meandering tracks (16) which form the resistor are divided in their longitudinal direction, at least once but preferably many times, by mutually parallel elongate gaps (19), cf. the sectional representation of a meandering track (16) in a section (17). Between longitudinally sequential gaps (19), gap-free cooling islands (18) with a predeterminable lengthwise separation (a) are provided, which allow an increased rated current carrying capacity without repercussions on the dynamic response under short-circuit conditions. With increasing mutual lengthwise separation (a) of the individual gaps (19), the rated current carrying capacity can be improved further. Further cooling islands (18') are provided on the meandering tracks (16) at the end.

By folding the structured metal sheet through 180° about the section plane (A–A'), a particularly low-induction structure with symmetrical routing of the current in both directions is achieved.

As the starting basis for the nonblocking PTC thermistor (5) a preferably ferromagnetic metal or metal alloy may be used. Materials based on nickel, iron or cobalt and their alloys are particularly suitable. The positive temperature coefficient of resistivity of these materials, which is particularly high compared to nonferromagnetic pure metals, has a nonlinear response which is beneficial for the application, with a maximum in the Curie temperature region. In principle, however, nonferromagnetic metals such as beryllium or ruthenium, with a temperature coefficient of resistance of $>4 \cdot 10^3$ $K^1$ may also be used.

Instead of a structured metal film, it is also possible to use a layer of the above described material composition, produced by means of a chemical or electrochemical process.

The required dynamic response of the PTC thermistor (5) under short circuit conditions is achieved by forming a small cross sectional area of the active part. Typical values for the cross sectional area are, for a circuit according to FIGS. 1 and 2, in the range from 0.1 $mm^2$ to 5 $mm^2$, and preferably in the range from 0.5 $mm^2$ to 1.5 $mm^2$. The cold resistances at room temperature are in the range of a few 10 mΩ to 100 mΩ.

Figure 7:
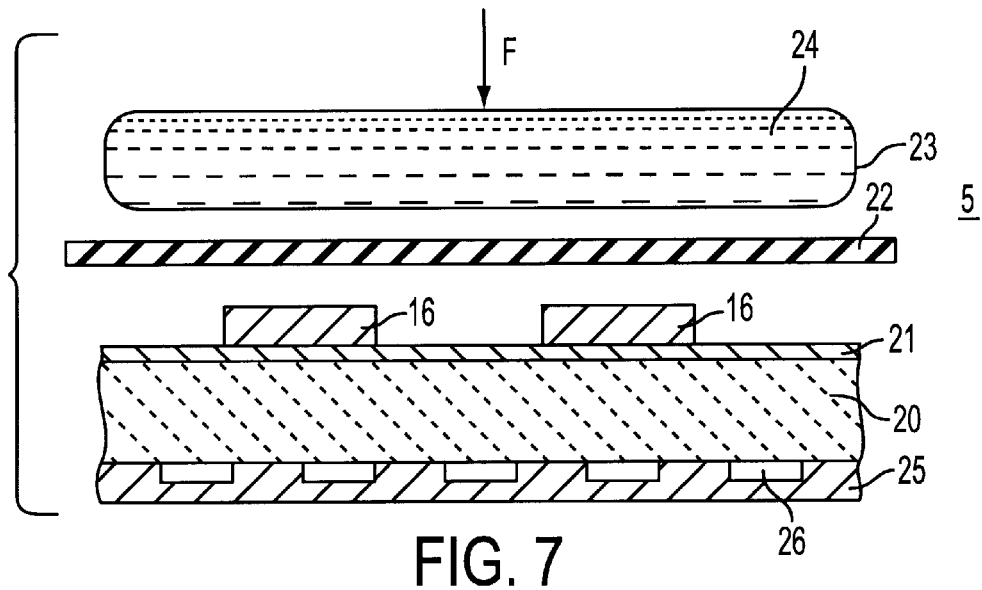
FIG. 7 shows the construction scheme of a PTC thermistor, which can be operated ungrounded, having an industrial-water cooling system for high electrical powers.

FIG. 7 shows the design scheme of a nonblocking PTC thermistor (5) which can be ungrounded. The resistive track of the thermisitor is represented in FIG. 6, in exploded representation in detail in the cross section on a section plane (B–B') orthogonal to the section plane (A–A'). An electrically insulating, thermally conductive insulation or ceramic layer (20), for example made of AlN or BN or $Al_2O_3$, is in contact electrically and with good thermal conduction via a first main surface with a metallic cooling element (25). The cooling element (25) has, adjoining the first main surface of the ceramic layer (20), cooling slots (26) through which preferably turbulent electrically conductive water (industrial water) flows during operation. A second main surface of the ceramic layer (20), opposite the first main surface, is covered with an electrically insulating thermal-conduction layer (21), for example of oil or a heat-transfer compound based on silicone, having a thickness in the range from 10 μm–100 μm. Meandering tracks (16) of the resistive body of the PTC thermistor (5) (cf. FIG. 6) are pressed between this thermal-conduction layer (21) and an electrically insulating, preferably thermally conductive, flexible high-temperature stable polymer film (22), for example made of a silicone elastomer, with a thickness in the range from 0.2 mm–10 mm, preferably in the range from 1 mm–5 mm. In order to provide pressure, a pressure compensation cushion or pressure-compensation element (23), on which a force (F) orthogonal to the second main surface of the ceramic layer (20) acts, may be provided. The pressure compensation element (23) may, for example, consist of a thin, flexible metal film which is welded to form a closed shell and has a thickness in the range from 0.2 cm–3 cm. The pressure compensation element (23) is filled with a dielectric or electrically conductive fluid (24) having a boiling temperature above preferably 150° C. Carboxylate esters, polyalcohol esters, polymeric dimethylsiloxanes or aliphatic pentaerythritol esters may be used as high boiling fluids (24). In order to increase the rated current carrying capacity, it is optionally possible to bring a further heat sink (not represented) into direct contact with the pressure compensation element (23). The pressure compensation element (23) provides, on the one hand, uniform pressing of the resistive tracks (16) onto the ceramic layer (20) and, on the other hand, compensation cooling by convection in order to protect the resistive tracks (16) from partial overheating.

The pressure compensation element (23) can, in particular, be left out whenever the high-temperature stable polymer film (22) consists of silicone elastomer or of another elastomer material, has a thickness in the range of 1.5 mm–10 mm and a Shore hardness in the range of 10 Shore A–100 Shore A.

Figure 8:
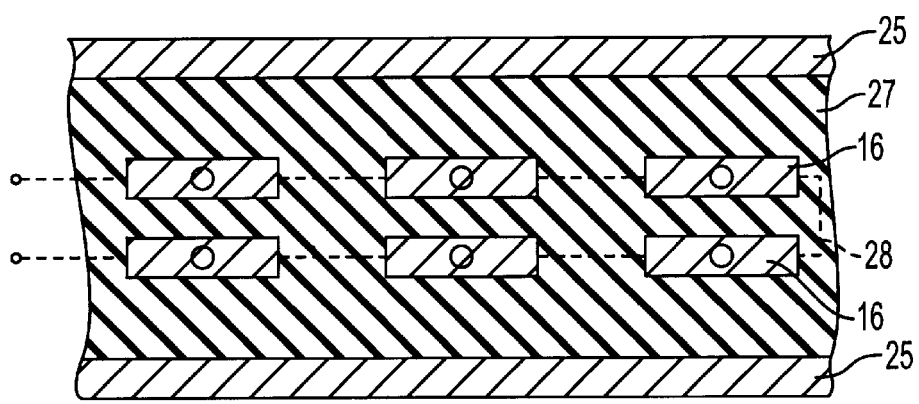
FIGS. 8 and 9 show the construction scheme of PTC thermistors having particularly low inductance.
Figure 9:
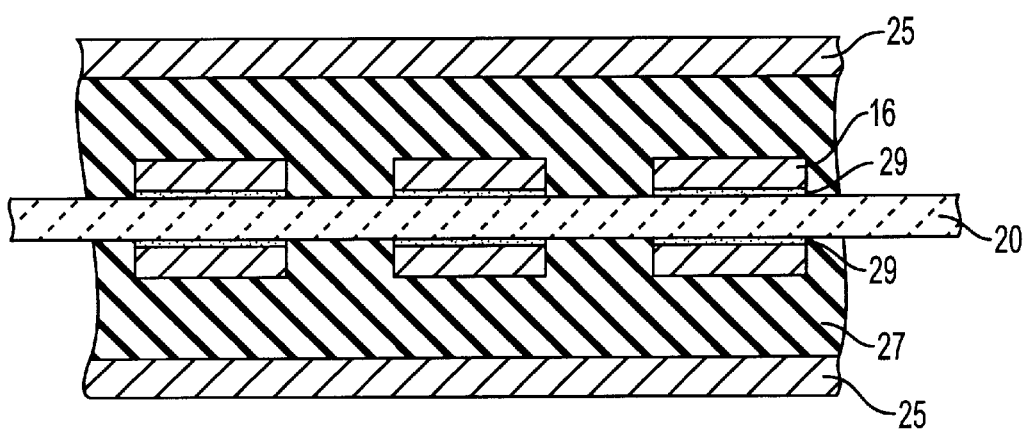

FIGS. 8 and 9 show particularly low-induction PTC thermistors (5) in detail in cross section. The resistive or meandering tracks (16) of the PTC thermistor (5) are here integrated or embedded in a polymer matrix (27) filled with inorganic, thermally conductive particles made of, for example, AlN, BN or $Al_2O_3$. The polymer matrix (27) consists of high temperature duromers and/or elastomers and/or high-temperature thermoplastics. The polymer matrix (27) preferably consists of polyether ether ketones (PEEK) and/or polyether imides (PEI) and/or polysulfones (PSU) and/or polyether sulfones (PES). A bimodally distributed powder is preferably used as filler, i.e. a powder whose particle size or particle diameter preferably has at least 2 frequency maxima. In order to increase the thermal conductivity, the in general maximum achieved filling ratio of 62 vol %, cf. the earlier-described paper by P. Bujard and J. P. Ansermet, can thereby be increased further. The elastic properties of the polymer matrix (27) allow good thermal contact with its peripheral metallic heat sinks or cooling elements (25) which are preferably cooled by a mixture of water and glycol.

At least approximately geometrically congruent resistive or meandering tracks (16), through which an electric current is fed in antiparallel, are embedded in the polymer matrix (27). An electrical line (28), which electrically connects the meandering tracks (16) at the end in such a way that current flows through neighboring meandering tracks (16) in an antiparallel direction, is shown in broken lines.

In the case of a PTC thermistor (5) embodiment according to FIG. 9, a Cr/Ni layer, approximately 1 μm thick, is applied as bonding layer (29) onto the meandering tracks (16) on one or both sides. A nickel or iron layer is applied onto this bonding layer (29) by means of an electrolytic chemical process or a soldering process. Instead of the Cr/Ni layer, a solder layer or another metal layer, for example made of tungsten, can be applied. When iron is used, a nickel or aluminum layer can be applied as corrosion protection in a second step. Via this layer (29), the meandering tracks (16) are in contact electrically and with good thermal conductivity with a ceramic layer (20), every 2 meandering tracks

(16) being opposite on the ceramic layer (20) with at least approximate geometrical congruence. As in the case of FIG. 8, the ceramic layer (20) and the meandering tracks (16) of the PTC thermistor (5) are embedded in a polymer matrix (27) and cooled by means of peripheral cooling elements (25), preferably using a mixture of water and glycol.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic assembly comprising:
   a cooling layer;
   a PTC thermistor, the PTC thermistor comprising a resistive track that has a meandering path, the resistive track comprising a first main surface and a second main surface, the first main surface opposite the second main surface;
   an electrically insulating ceramic layer between the first main surface and the cooling layer;
   an electrically insulating thermally conductive layer between the first main surface and the electrically insulating ceramic layer;
   a pressure compensator, the pressure compensator applying pressure to the second main surface when a force is applied to the pressure compensator, wherein the pressure compensator comprises a metal film that forms a closed shell that is filled with a dielectric or electrically conductive fluid having a boiling temperature above 150° C.; and
   a flexible, thermally conductive polymer sheet, the polymer sheet interposed between the pressure compensator and the second main surface such that it is in direct contact with the second main surface.

2. The device as claimed in claim 1, wherein the polymer sheet consists of an elastomer material having a thickness in the range from 1.5 mm–10 mm.

3. The device of claim 2, wherein the polymer sheet has a Shore hardness in the range of 10 Shore A to 100 Shore A.

4. The device as claimed in claim 1, wherein the electrically insulating thermally conductive layer is a silicone-based heat-transfer compound that has a thickness in the range from 10 $\mu$m–100 $\mu$m.

5. An electronic assembly comprising:
   at least one cooling layer;
   an electrically insulating, thermally conductive polymer matrix;
   a PTC thermistor, the PTC thermistor comprising a resistive track that has a meandering path, the resistive track comprising a first part and a second part, the resistive track embedded in the polymer matrix and spreading horizontally therein such that the polymer matrix adjoins the resistive track on more than two sides, the resistive track thermally connected via the polymer matrix to the at least one cooling layer, wherein the resistive track is folded such that a meandering path of the first part is vertically aligned with a meandering path of the second part in separate horizontal planes; an insulation layer between the meandering path of the first part and the meandering path of the second part; and
   a metal layer between the insulation layer and at least one of the two meandering paths.

6. The PTC thermistor of claim 5, wherein the metal layer is a Cr/Ni layer.

7. A current limiter device, comprising:
   at least two PTC thermistor assemblies connected in series in a first circuit branch, each PTC thermistor assembly having:
   a cooling layer;
   a resistive track, the resistive track comprising a first main surface and a second main surface, the cooling layer opposite the first main surface;
   an electrically-insulating thermally conductive layer;
   an insulation layer interposed between the first main surface and the cooling layer, wherein the resistive track is connected by the electrically-insulating thermally conductive layer to the insulation layer;
   a pressure compensator, the pressure compensator applying pressure to the second main surface; and
   a polymer film interposed between the pressure compensator and the second main surface such that it is in direct contact with the second main surface, the device further comprising:
   at least one varistor in a second circuit branch electrically connected in parallel with the first circuit branch, wherein at least one further electrical resistor is connected in the second circuit branch in series with the at least one varistor wherein
   at least one of the PTC thermistor assemblies has on heating resistance which jumps to less than 100 times its cold resistance, and
   of which at least another one of the PTC thermistor assemblies has on heating resistance which jumps to more than 100 times its cold resistance.

8. The device as claimed in claim 7, wherein one of the at least one further resistor in the second circuit branch is a PTC thermistor.

9. The device of claim 8, wherein the series circuit in the second circuit branch has an inductor.

10. The device as claimed in claim 7, wherein a diode is connected in a third circuit branch connected in parallel with the first circuit branch.

11. The device of claim 7, wherein one of the at least one further resistor is an ohmic resistor, and the series circuit in the second branch includes an inductor.

12. The device of claim 7, wherein the another one of the PTC thermistor assemblies has, on heating, resistance jumps to more than $10^4$ times its cold resistance.

13. The device of claim 11, wherein the series circuit in the second circuit branch has an inductor.

14. An electronic assembly comprising:
   a PTC thermistor, the PTC thermistor comprising a resistive track;
   a cooling layer;
   an insulation layer disposed between a first surface of the resistive track and the cooling layer;
   a pressure compensator, the pressure compensator applying pressure to a second surface of the resistive track when a force is applied to the pressure compensator, wherein the pressure compensator comprises a metal film that forms a closed shell; and
   a flexible, thermally conductive polymer sheet, the polymer sheet interposed between the pressure compensation element and the second main surface such that it is in direct contact with the second main surface.

15. The device of claim 14, wherein the pressure compensator applies pressure directly to the second surface of the resistive track.

16. The device of claim 14, wherein the resistive track is connected by an electrically-insulating thermally conductive layer to the insulation layer.

* * * * *